United States Patent [19]

Otani

[11] Patent Number: 4,537,439

[45] Date of Patent: Aug. 27, 1985

[54] ASH TRAY ASSEMBLY OF VEHICLE

[75] Inventor: Syuichi Otani, Zama, Japan

[73] Assignee: Nissan Motor Co., Ltd., Japan

[21] Appl. No.: 608,909

[22] Filed: May 10, 1984

[30] Foreign Application Priority Data

Jun. 2, 1983 [JP] Japan ................................ 58-98607

[51] Int. Cl.³ .............................................. B60N 3/08
[52] U.S. Cl. ................................ 296/37.9; 296/37.12;
312/246; 206/0.81; 224/278
[58] Field of Search ..................... 296/37.1, 37.8, 37.9,
296/37.12; 131/231, 238, 329; 206/216, 0.81;
312/126, 246, 330 R; 108/13, 57.1, 62; 224/278,
280–282

[56] References Cited

U.S. PATENT DOCUMENTS

| | | | |
|---|---|---|---|
| 1,440,255 | 12/1922 | Ward | 296/37.9 X |
| 2,319,173 | 5/1943 | Weiss | 131/238 X |
| 2,608,454 | 8/1952 | Slattery | 108/62 X |
| 2,800,360 | 7/1957 | Jenkins | 224/281 X |
| 3,177,033 | 4/1965 | Daniels | 296/37.8 |

FOREIGN PATENT DOCUMENTS 436554  5/1912  France ................................ 206/0.81

Primary Examiner—Robert B. Reeves
Assistant Examiner—Russell D. Stormer
Attorney, Agent, or Firm—Leydig, Voit and Mayer, Ltd.

[57] ABSTRACT

An ash tray of the drawer type is movably installed in an instrument panel of an automotive vehicle. The ash tray in its right position functions to receive ash of a cigarette in its ash receiving cavity formed on its right side, and can take its reverse position upon being turned upside down so as to disable it from receiving cigarette ash while enabling to store articles at an article storing section formed on its reverse side, so that the ash tray becomes useful even for a nonsmoker.

10 Claims, 6 Drawing Figures

4,537,439

ASH TRAY ASSEMBLY OF VEHICLE

BACKGROUND OF THE INVENTION

1. Field of the Invention

This invention relates in general to an ash tray assembly of a vehicle, and more particularly to an improvement in an ash tray of a drawer type wherein an ash tray is movably supported in an installation section of a vehicle body so as to be able to be drawn out by a passenger.

2. Description of the Prior Art

In connection with ash trays used in automotive vehicles, there is one of the drawer type wherein an ash tray is slidably supported by a support member to be able to be drawn out by a passenger. Such an ash tray is easy to use and therefore convenient for the passenger who is a smoker. However, the ash tray is useless for the passenger who is a nonsmoker, and it is impossible to use it for the other purposes.

SUMMARY OF THE INVENTION

An ash tray assembly of the present invention comprises an ash tray of a drawer type which is formed with an ash receiving cavity on a first side thereof and takes a first position in which the ash receiving cavity opens upwardly to function to receive ash therein. The ash tray is slidably supportd by an installation section which is formed in a vehicle body. The ash tray is provided with an article storing section on a reverse side thereof which side is opposite the first side. Additionally, the ash tray can be turned upside down and supported by the installation section to take a second position in which said ash receiving cavity opens downwardly to disable the ash receiving cavity from receiving the ash while enabling the article storing section to store articles. Accordingly, in case where a nonsmoker uses a vehicle, the ash tray can be used a container for storing articles upon being turned upside down and installed in position.

BRIEF DESCRIPTION OF THE DRAWINGS

The features and advantages of the ash tray assembly according to the present invention will be more appreciated from the following description taken in conjunction with the accompanying drawings in which like reference numerals designate the corresponding parts and elements in which.

DETAILED DESCRIPTION OF THE INVENTION

Figure 1:
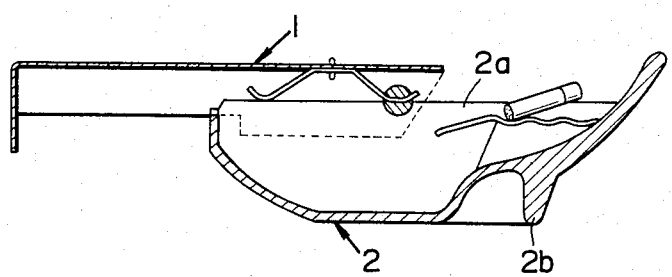
FIG. 1 is a vertical sectional view of a conventional ash tray assembly.

To facilitate understanding the present invention, a brief reference will be made to a conventional ash tray assembly of an automotive vehicle, depicted in FIG. 1. The conventional ash tray assembly includes an installation section which is made up of a supporting member 1 secured to a vehicle body (not shown). The support member 1 is arranged to movably support an ash tray 2 of the drawer type which is formed with an ash receiving cavity 2a and provided with a pull 2b. Accordingly, the ash tray 2 can be moved leftward in the drawing to be withdrawn and rightward in the drawing to take a position shown in FIG. 1 in which ash of a cigarette is received in the ash receiving cavity 2a.

Although such an ash tray assembly is convenient for smokers, it is useless for nonsmokers who drive vehicles because the ash receiving cavity 2a cannot be used as a container for any articles.

Figure 2:
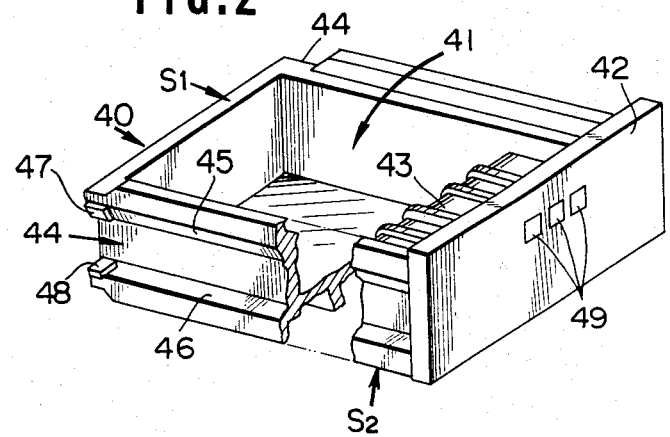
FIG. 2 is a perspective view, partly in section, of an ash tray in its first position of an embodiment of an ash tray assembly according to the present invention.
Figure 3:
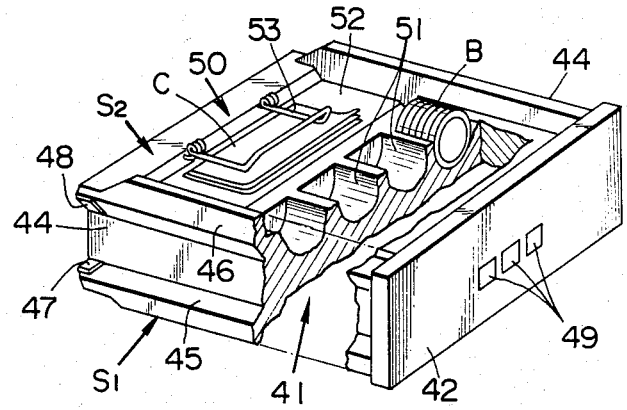
FIG. 3 is a perspective view, partly in section, of the ash tray of FIG. 2, but showing the ash tray in its reverse position.
Figure 4:
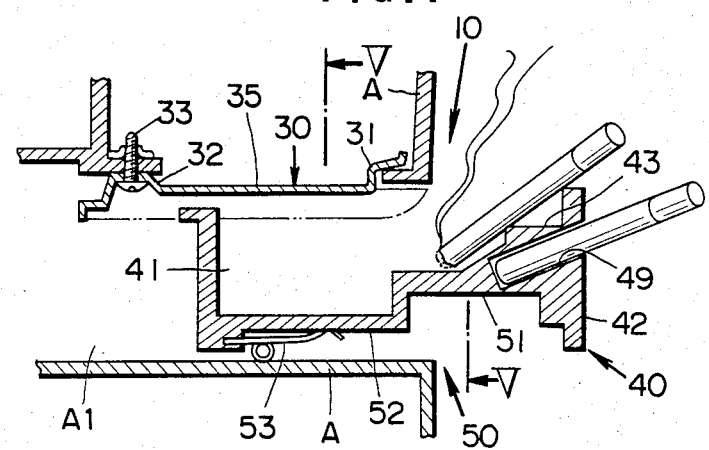
FIG. 4 is a vertical sectional view of the embodiment of the ash tray assembly according to the present invention in which the ash tray is in the first position.

In view of the above description of the conventional ash tray assembly of vehicles, reference is now made to FIGS. 2 to 6, more specifically to FIG. 4, wherein a preferred embodiment of an ash tray assembly of the present invention is illustrated by the reference numeral 10. The ash tray assembly 10 is incorporated with an instrument panel A of an automotive vehicle, which instrument panel A is formed with an ash tray storing space A1 in which an ash tray 40 of the drawer type can be stored. An ash tray supporting member 30 is secured to the instrument panel A at a section defining an upper part of the storing space A1. More specifically, the supporting member 30 is securely installed in position by hooking the front end section 31 thereof on an inner edge of the instrument panel A and by fastening the rear end section 32 thereof to the instrument panel A by means of screws 33. Accordingly, the ash tray 40 can be stored in the storing space A1 of the instrument panel A in such a manner that the ash tray 40 can be drawn out rightward in FIG. 4 to take an open position as shown in FIG. 4 when pulled by a passenger. The ash tray 40 is of course moved leftward in FIG. 4 to be inserted into the instrumental panel storing space A1 when pushed by the passenger.

Figure 5:
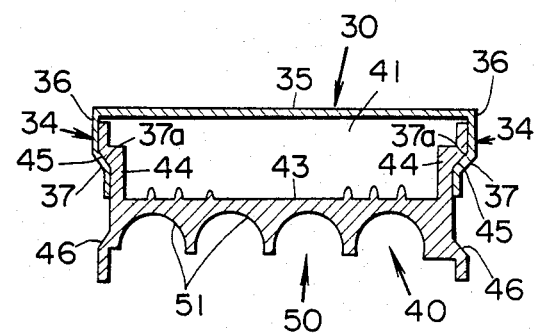
FIG. 5 is a sectional view taken in the direction of arrows substantially along the line V—V of FIG. 4.

As best shown in FIG. 5, the support member 30 includes a flat upper wall section 35 directly connected to the instrument panel A. Two elongated supporting sections or side walls 34, 34 are integrally connected with the opposite side portions of the upper wall section 35, respectively, and extend downwardly from the upper wall section 35. Each supporting section 34 includes a vertical portion 36 which is vertical relative to the upper wall section 35 and integrally connected at its upper edge with the side edge of the upper wall section 35. The supporting section 34 further includes an inclined portion 37 which has an inner supporting face 37a and is inwardly inclined relative to the vertical portion 36 and integrally connected at its upper edge with the lower edge of the vertical portion 36. It will be understood that the supporting member 30 of such a shape may be made by bending a sheet material.

FIG. 2 shows the ash tray 40 in its first position in which an ash receiving cavity 41 is formed on a first side $S_1$ and opens upward to enable to receive ash of a cigarette therein. The ash tray 40 is provided with a front wall section 42 serving as a pull. A steps-like cigarette receiving bank section 43 is formed to be projected from the inner surface of the front wall section 42 into the ash receiving cavity 41. It will be understood that a cigarette with fire is put on the bank section 43 as shown in FIG. 4. The ash tray 40 is further provided with two oppositely disposed side wall sections 44, 44 each of which is formed at its outer surface with first and second narrow inclined contact or supporting faces 45, 46 elongating in the direction in which the ash tray 40 is drawn out. The first and second contact faces 45, 46 are engageable with the supporting face 37a of the inclined portion 37 of the support member supporting section 34. The first inclined contact surface 45 is brought into slidable contact with the inclined portion 37 when the ash tray 40 is in the first position as shown in FIG. 2. On the contrary, the second inclined contact face 46 is brought into slidable contact with the inclined portion 37 when the ash tray 40 is in a inverted position as shown in FIG. 3 in which the ash receiving cavity 41 opens downward to disable the ash receiving cavity 41 from receiving the cigarette ash. Additionally, first and second stoppers 47, 48 are secured on the first and second contact surfaces 45, 46, respectively, in a manner to be projected from the contact surfaces. Each stopper 47, 48 is located at an extreme end portion of the contact surface 45, 46 opposite the front wall section 42.

Figure 6:
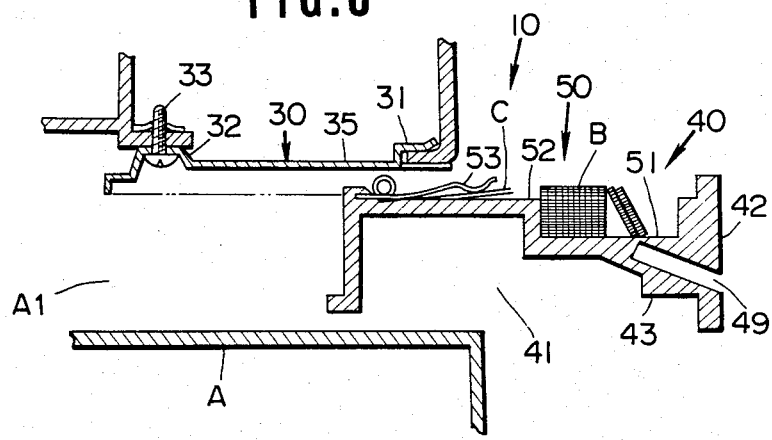
FIG. 6 is a vertical sectional view of the ash tray assembly of FIG. 4, in which the ash tray is in its reverse position.

As shown in FIG. 3 depicting the ash tray in the reverse position, the ash tray 40 is formed with an article storing section 50 on a reverse side $S_2$ of the ash tray which side is opposite the above-mentioned first side $S_1$. The article storing section 50 includes coin storing cavities 51 on the reverse side of the cigarette receiving bank 43 in order that coins are stored therein on peripheral edge as shown in FIGS. 3 and 6. Additionally, a storing surface 52 for tickets is formed on the reverse side of a bottom wall defining the ash receiving cavity 41 as shown in FIG. 3. A spring type fixing device 53 for the tickets are provided to temporarily fix the tickets on the storing surface 52. While only the coin storing cavities 51 and the storing surface 52 have been shown and described as being formed as parts of the article storing section 50, it is only an example and therefore it will be understood that other cavities for other purposes may be formed and other devices may be provided as parts of the article storing section 50. As shown in FIG. 4, the ash tray front wall section 42 is formed with spare cigarette holder holes extending into the cigarette receiving bank 43 in order that spare cigarettes are inserted thereinto.

With the thus arranged ash tray assembly 10, in the first position of the ash tray 40 as shown in FIGS. 2, 4 and 5, the first contact surface 45 of the ash tray 40 is in engagement with the inclined portions 37 of the support member support section 34 so that the ash tray 40 is slidably supported by the support member 30. Accordingly, when the ash tray 40 is drawn out from the storing space A1 of the instrument panel A by the passenger who holds the ash tray front wall 42, the ash tray 40 can be used for its purpose in which the ash receiving cavity 41 opens upward to enable to receive cigarette ash therein.

When the ash tray 40 is completely inserted by being pushed into the storing space A1, the upper wall section 35 of the support member 30 serves as a lid to tightly cover up the ash tray 40, thereby extinguishing the fire of the cigarette. The cigarette receiving bank section 43 is used so that a cigarette with fire is put thereon. It will be understood that the cigarette with fire is held on the cigarette receiving bank section 43 while a cigarette without fire can be inserted into the spare cigarette holder hole 49 thereby to be ready to be smoked. When the ash tray 40 is pulled out, the first stopper 47 is brought into contact with an innermost end of the inclined portion 37 of the support member supporting section 34 so that the drawing-out action of the ash tray 40 is stopped under the usual light force exerted by the passenger, thus preventing the ash tray 40 from being completely drawn out. However, when the ash tray 40 is further drawn out under a stronger force than the usual light force, the first stopper 47 can run on the inclined portion 37, so that the ash tray 40 can be completely drawn out from the storing space A1 of the instrument panel A.

In case where the ash tray 40 is to be used as a storing container for articles, the ash tray 40 is completely drawn out from the instrument panel storing space A1 and thereafter is turned upside down so that the ash receiving cavity 41 opens downward thereby disabling the ash receiving cavity 41 from receiving the cigarette ash. Then, the ash tray 40 is installed on the support member 30 in such a manner that the second contact face 46 is brought into engagement with the inclined portion 37 of the support member supporting section 34. During this ash tray installation, although the second stopper 48 is brought into contact with the inclined portion 37 to interrupt the smooth insertion of the ash tray 40 into the instrument panel storing space A1, it is possible to install the ash tray 40 in the reverse position as shown in FIG. 6 by strongly pushing the ash tray 40 into the support member 30 so that the second stopper 48 runs on the inclined portion 37 of the support member supporting section 34. As a result, the second contact face 46 is brought into engagement with the inclined portion 37 of the support member support section 34 as shown in FIG. 6 in which the ash tray 40 in the reverse position can be pulled out from and withdrawn into the instrument panel storing space A1. In this reverse position of the ash tray 40, the article storing section 50 is located on the upper side, so that coins can be stored in the coin storing cavities 51 while tickets C can be held down on the storing surface 52 by means of the spring type fixing device 53, thus effectively storing the coins and tickets.

In order to again use the ash tray 40 for the purpose of receiving the cigarette ash, the ash tray 40 in the reverse position is drawn out under the stronger force exerted by the passenger so that the second stopper 47 runs on the inclined portion 37 of the support member 30. After completely drawn out from the instrument panel storing space A1, the ash tray 40 is turned upside down to take the first position and then strongly pushed in between the opposite inclined portions 37 in such a manner that the first stopper 47 runs on the inclined portion 37 of the support member 30. Thus, the ash tray 40 is kept in the first position and can be pulled out from and withdrawn in the instrument panel storing space A1 while being slidably supported by the support member 30.

As appreciated from the above, according to the present invention, the ash tray can be used for the purpose of storing various articles upon being turned upside down in addition to the inherent purpose of receiving cigarette ash, so that the ash tray can be used for either one of purposes corresponding to requirements. According to the present invention, the ash receiving cavity of the ash tray is not used to store the articles and therefore the ash tray can serve as an article storing container only by discarding the content in the ash receiving cavity even if the ash receiving cavity is filled with it. Thus, the service of the ash tray is widened while enabling to functionally use the ash tray. Besides, the ash tray becomes effective for nonsmokers while improving the usage of the vehicle, thus contributing to increasing the value of the vehicle.

What is claimed is:

1. An ash tray assembly of a vehicle, comprising:
an ash tray of a drawer type, formed with an ash receiving cavity on a first side thereof and having a first position in which said ash receiving cavity opens upward to function to receive ash therein;
an installation section in which said ash tray is slidably movably supported in said first position, said installation section being formed in a vehicle body;
means defining an article storing section on a reverse side of said ash tray which side is opposite the first side; and
means for supporting said ash tray on said installation section in an inverted position in which said ash receiving cavity opens downward to disable said ash receiving cavity from receiving the ash while enabling said article storing section to store articles.

2. An ash tray assembly as claimed in claim 1, wherein said ash tray has two oppositely disposed side walls, each side wall being formed with a first supporting elongate face extending in a direction in which said ash tray is drawn out, and a second elongate supporting face extending parallel with said first supporting face.

3. An ash tray assembly as claimed in claim 2, wherein said installation section includes a supporting member secured to the vehicle body, said supporting member having two oppositely disposed side walls, each side wall being formed with a supporting face which is in slidable engagement with the first supporting face of said ash tray when said ash tray is in the first position while it is in slidable engagement with the second supporting face of said ash tray when said ash tray is in the inverted position.

4. An ash tray assembly as claimed in claim 3, wherein the supporting face of said supporting member side wall inwardly inclines, while the supporting face of ash tray side wall inwardly inclines to maintain a face-to-face contact between it and the supporting face of said supporting member side wall.

5. An ash tray assembly as claimed in claim 2, wherein said ash tray has a front wall connected to said side walls and serves as a pull, in which said ash tray is formed on its first side with a cigarette receiving bank extending from said front wall to said ash receiving cavity.

6. An ash tray assembly as claimed in claim 5, wherein said article storing section includes coin storing cavities which are located on the reverse side of said cigarette receiving bank, and a ticket storing face which is located on the reverse side of a bottom surface of said ash tray defining said ash receiving cavity.

7. An ash tray assembly as claimed in claim 6, wherein said ash tray is provided with on its reverse side with means for temporarily fixing tickets on said ticket storing surface.

8. An ash tray assembly as claimed in claim 5, wherein said front wall is formed with holes for receiving cigarettes.

9. An ash tray assembly as claimed in claim 3, wherein said supporting member has an upper wall to which said side walls of said supporting member are integrally connected, said upper wall serving as a lid for said ash tray and securely connected to said vehicle body.

10. An ash tray assembly as claimed in claim 9, wherein said vehicle body includes an instrument panel which defines a space in which said ash tray is capable of being stored, said instrument panel having an inner upper wall to which the upper wall of said supporting member is securely connected.

* * * * *